(12) United States Patent
Yasue et al.

(10) Patent No.: US 7,428,619 B2
(45) Date of Patent: Sep. 23, 2008

(54) METHODS AND APPARATUS FOR PROVIDING SYNCHRONIZATION OF SHARED DATA

(75) Inventors: Masahiro Yasue, Kanagawa (JP); Keisuke Inoue, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 316 days.

(21) Appl. No.: 11/037,864

(22) Filed: Jan. 18, 2005

(65) Prior Publication Data

US 2006/0161741 A1  Jul. 20, 2006

(51) Int. Cl.
G06F 13/16 (2006.01)
G06F 12/00 (2006.01)

(52) U.S. Cl. .................. 711/150; 711/147; 711/152
(58) Field of Classification Search .............. 711/152
See application file for complete search history.

(56) References Cited

U.S. PATENT DOCUMENTS

| | | | | |
|---|---|---|---|---|
| 4,975,833 A | * | 12/1990 | Jinzaki | 711/152 |
| 5,434,995 A | | 7/1995 | Oberlin | |
| 5,519,877 A | | 5/1996 | Yoneda | |
| 5,634,037 A | * | 5/1997 | Sasaki et al. | 711/152 |
| 5,796,946 A | | 8/1998 | Sakon | |
| 5,983,326 A | * | 11/1999 | Hagersten et al. | 711/147 |
| 6,052,763 A | * | 4/2000 | Maruyama | 711/152 |
| 6,216,174 B1 | | 4/2001 | Scott | |
| 6,466,988 B1 | | 10/2002 | Sukegawa | |
| 6,557,084 B2 | * | 4/2003 | Freerksen et al. | 711/147 |
| 2003/0043156 A1 | | 3/2003 | Macy et al. | |
| 2003/0088610 A1 | * | 5/2003 | Kohn et al. | 709/107 |
| 2004/0181636 A1 | * | 9/2004 | Martin et al. | 711/152 |

FOREIGN PATENT DOCUMENTS

| | | |
|---|---|---|
| JP | 58-169659 | 10/1983 |
| JP | 08-016456 | 1/1996 |

OTHER PUBLICATIONS

Japanese Office Action dated Oct. 2, 2007 corresponding to Japanese Patent Application No. 2006-006723, 4 pages.
J.B. Carter et al: "A Comparison of Software and Hardware Synchronization Mechanisms for Distributed Shared Memory Multiprocessors" Sep. 24, 1996, XP002466304, University of Utah; 24 Pages; retrieved from the internet: http://www.cs.utah.edu/research/techreports/1996/pdf/UUCS-96-011.pdf>.
Mellor-Crummey J M et al.: "Scalable reader-writer synchronization for shared-memory multiprocessors" ACM Sigplan Notices, ACM, Association for Computing Machinery, New York, NY, US, vol. 26, No. 7, Jul. 1991, pp. 106-113, XP002402085.

* cited by examiner

*Primary Examiner*—Gary J Portka
(74) *Attorney, Agent, or Firm*—Lerner, David, Littenberg, Krumholz & Mentlik, LLP

(57) ABSTRACT

A synchronization scheme is provided for a multiprocessor system. In particular, a processor includes a buffer sync controller. The buffer sync controller is operative to allow or deny access by a subprocessor to shared data in a shared memory, such that a processor seeking to write data into or read data from the shared memory must ascertain certain shared parameter data processed by the buffer sync controller.

20 Claims, 13 Drawing Sheets

METHODS AND APPARATUS FOR PROVIDING SYNCHRONIZATION OF SHARED DATA

BACKGROUND OF THE INVENTION

In a multiprocessor system, data integrity is always of key concern. For instance, in multiprocessing systems employing a plurality of sub-processing units, the sub-processing units typically have no cache system (memory storage space apart from main memory such as random access memory (RAM)) Thus, because such subprocessors may share common data, synchronization between and among processors is required in order to ensure coherency of shared data.

Traditional approaches to achieving such synchronization have involved the use of a synchronization variable to serve as a "barrier object," in an object oriented software program, to control read and write access to shared data. For instance, a typical barrier object that prevents access to shared memory when necessary can be created in software by a processor which can initialize a synchronization procedure by creating a barrier object. For example, in connection with a continuous loop of a main program running in a multiprocessor system, indexed data, is written to a memory or buffer area shared for use by the processors. Pseudo code for implementing a barrier procedure is as follows:

Initialization of synchronization: create barrier object (objB)
Main loop:
  Wait on objB
  Create data $D_m$
  Write $D_m$ to shared area
    $m=m+1$ The barrier object objB includes a variable which permits or denies access to the memory area shared by the processors such that after creation of the barrier object, the main processor or subprocessor units must wait until the barrier object is available before the data in the shared memory can be read from or written to.

A buffer can be created by each processor in conjunction with a request for the barrier object objB, in which data is placed pursuant to a READ of the shared memory area or pursuant to a WRITE to the shared memory area. Pseudo code for this request procedure also involving the buffer object is as follows:

Synchronization initialization:
  get barrier object (objB)
  create buffer to get data (buf)
  wait on objB A processor requesting data in accordance with this procedure must therefore wait until the variable associated with objB becomes available, indicating that the memory in the shared area is available for reading or writing. Once the barrier object is received by a requesting processor for a READ of the shared data, data from the shared memory can be placed in a buffer corresponding to locations in the shared memory. Pseudo code for this procedure could be as follows:

Main loop:
  Wait on objB
  Sub loop:
    get place of data . . . i
    get $Dm_i$ to buf and calculate loop while (i<num)

Alternatively, should the variable indicate the objB is available and additionally that the shared memory is available for a WRITE, data in a buffer is placed into corresponding locations in the shared memory.

As noted, the individual processing elements of such a multi-processor system must wait on the barrier object in order to synchronize to one another. The processing element that creates the shared data also waits on the barrier object during the writing of such data to shared memory. Finally, the processing elements seeking to read the shared data from memory also wait on the barrier object during the reading process.

The efficacy of this traditional approach of using a synchronization variable in the multi-processor environment is typically a function of the diligence of the software programmer in coding the interrelationships between processing elements created by the barrier object. As it is a relatively complex and difficult task to ensure that the software code accurately reflects the barrier object interrelationships, programming errors often occur. This problem is exacerbated because it is difficult to debug software programs that contain coding errors associated with synchronization variables. Further, barriers provided by software generally require a great deal of customization. Accordingly, improved synchronization methods and systems are needed.

SUMMARY OF THE INVENTION

In accordance with a preferred aspect of the present invention, there is provided a method of providing synchronization of shared data access among a plurality of processors in a multi-processor system. The method includes storing shared parameter data including one or more conditions relating to access to data shared by a plurality of processors; modifying the shared parameter data based on the access by the processors to the shared data; and preventing and granting access to the shared data by the processors based on the shared parameter data.

Preferably, the one or more conditions includes a first condition indicating the number of the processors accessing the shared data and a second condition indicating whether the access to the shared data is being denied in writing to the shared data. Further, access to read the shared data is preferably granted upon the second condition indicating that none of the processors are writing to the shared data, and access to write to the shared data by one of the processors is granted upon the second condition being set to deny access to the shared data by all other of the processors following an indication by the second condition that none of the processors were writing to the shared data.

Another aspect of the present invention provides a system for providing synchronization of shared data access among a plurality of processors, including a plurality of processors, each of the processor including a buffer sync controller for processing shared parameter data and to control access to shared data shared by the plurality of processors in accordance with the state of the shared parameter data.

Preferably, the shared parameter data indicates the number of processors reading the shared data and also whether one of the processors is writing to the shared data. The plurality of processors preferably includes at least two or more sub-processors. The system may further include a direct memory access controller for controlling access to the shared data by the plurality of processors and a shared memory for storing the shared parameter data and the shared data. The buffer sync controller may also be integrated with the processors.

The shared parameter data may include a first condition indicating the number of the processors accessing the shared data and a second condition indicating whether the access to the shared data is being denied in writing to the shared data. The shared parameter data may also includes a writer lock parameter associated with writing to the shared data and a reader count parameter associated with the number of processors reading the shared data.

Still another aspect of the present invention provides a method of providing synchronization of shared data access in a multi-processor system including sharing data among a plurality of processors in accordance with one or more conditions provided by shared parameter data accessible to the processors; and preventing and granting access to the shared data by one or more of the processors based on the one or more conditions.

Another aspect of the present invention provides a buffer sync controller for providing synchronization of shared memory access in a multi-processor system by a plurality of processors, which includes an initialization unit for providing a first parameter indicative of a number of processors reading shared data and a second parameter indicative of whether the shared data is being written to by one of the processors; a control unit; a synchronization unit for receiving a request for access to the shared data from the control unit and for granting the request for access based on the states of the first and second parameters; and a data transfer unit for receiving a request to transfer data from the shared memory by the control unit and granting the request to transfer data in connection with predetermined values of the first and second parameters.

An even further aspect of the present invention provides a method for providing synchronization for memory access pursuant to a write to shared memory in a multiprocessor system comprising: receiving a request to write to a shared memory area by a selected processor; receiving a read count indication that no other processors are reading data in the shared memory area; receiving a write access condition indicating the shared memory area is available to read; setting the write access condition to prevent other processors from access to the shared memory area; writing data to the shared memory after setting the access condition to prevent access by other processors; and setting the access condition to enable other processors to access the shared memory area after writing the data. Preferably, the method includes storing the write access condition and the read count condition in a shared parameter data memory location accessible by the processors.

In accordance with the present invention, a method is also provided for providing synchronization for memory access pursuant to a read of shared memory area in a multiprocessor system comprising: requesting a read of data shared memory area; receiving an access flag indicating access to the shared memory area; incrementing a READ variable indicative of the number of processors reading the shared memory area; reading data in the shared memory; and decrementing the variable following the reading of the data.

In accordance with another aspect of the present invention, there is provided apparatus for providing synchronization of shared data access among a plurality of processors comprising: a processing element including two or more processing units connected via a bus, the one or more processing units being connectable to a memory and operable to issue instructions, and wherein the processing units are programmed to share data in accordance with one or more conditions provided by shared parameter data accessible to the processing units and to prevent and grant access to the shared data by the processing units based on the one or more conditions.

Another aspect of the present invention provides a medium storing instructions to cause a one or more processors to provide synchronization of shared data access among a plurality of processors comprising instructions for sharing data among a plurality of processors in accordance with one or more conditions provided by shared parameter data accessible to the processors; and preventing and granting access to the shared data by one or more of the processors based on the one or more conditions.

Figure 1:
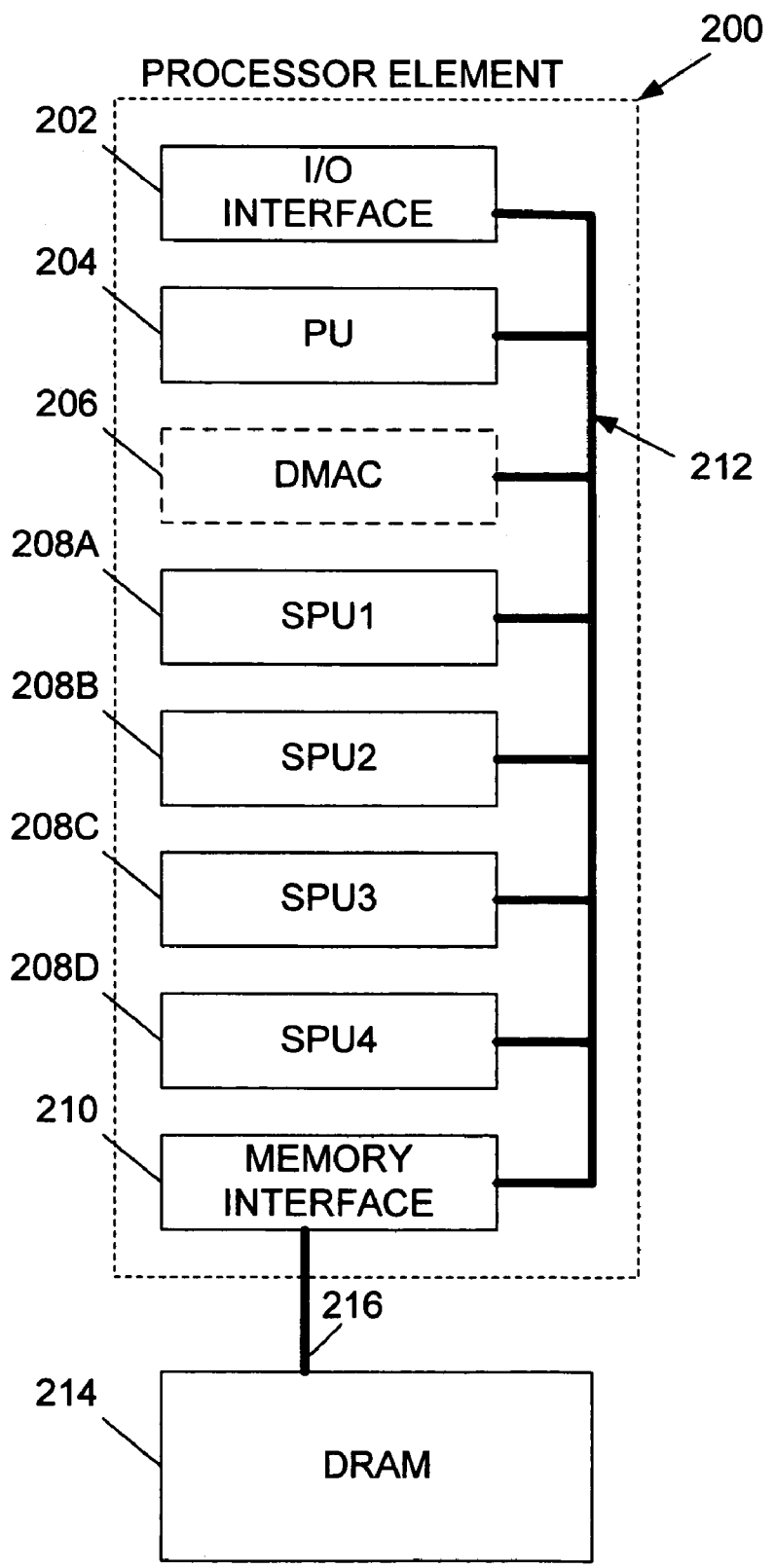
FIG. 1 is a block diagram of a basic processing module or processor element.

Applicable reference numbers have been carried forward.

DETAILED DESCRIPTION

A synchronization system and method for a multiprocessor system is provided by the present invention. Preferably, the present invention can be implemented in conjunction with a computing architecture where all processors are designed to process a unit of software known as a cell. The present invention can thus be used with a computer architecture known as the CELL architecture, such as described in U.S. Pat. No. 6,526,491, the disclosures of which are incorporated by reference herein. A common computing module is described in the applications for use with cell architecture, which has a consistent structure and supports the same instruction set architecture. A multi-processing computer system using the cell architecture can be formed of many different types of computers, such as one or more clients, servers, PCs, mobile computers, game machines, PDAs, set top boxes, appliances, digital televisions and other devices using computer processors.

A plurality of these computers or computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

In accordance with one aspect of the present invention, the basic processing module is a processor element (PE). In this regard, reference is made to FIG. 1, which is block diagram of a basic processing module or processor element (PE) 200. As shown in this figure, PE 200 comprises an I/O interface 202, a processing unit (PU) 204, a direct memory access controller (DMAC) 206, and a plurality of sub-processing units 208, namely, sub-processing unit 208A, sub-processing unit 208B, sub-processing unit 208C, and sub-processing unit 208D. A local (or internal) PE bus 212 transmits data and applications among the PU 204, sub-processing units 208, DMAC 206, and a memory interface 210. Local PE bus 212 can have, e.g., a conventional architecture or it can be implemented as a packet switch network. Implementation as a packet switch network, while requiring more hardware, increases available bandwidth.

PE 200 can be constructed using various methods for implementing digital logic. PE 200 preferably is constructed as a single integrated circuit employing a complementary metal oxide semiconductor (CMOS) on a silicon substrate. Alternative materials for substrates include gallium arsenide, gallium aluminum arsenide and other so-called III-V compounds employing a wide variety of dopants. PE 200 can also be implemented using superconducting material, e.g., rapid single-flux-quantum (RSFQ) logic.

PE 200 is closely associated with dynamic random access memory (DRAM) 214 through high bandwidth memory connection 216. DRAM 214 functions as the main memory for PE 200. Although DRAM 214 preferably is a dynamic random access memory, DRAM 214 can be implemented using other means, e.g., static random access memory (SRAM), magnetic random access memory (MRAM), optical memory, holographic memory, etc. DMAC 206 and memory interface 210 facilitate the transfer of data between DRAM 214, sub-processing units (also known as sub-processors) 208 and PU 204 of PE 200. It is noted that DMAC 206 and/or memory interface 210 may be integrally or separately disposed with respect to sub-processing units 208 and PU 204. Indeed, instead of a separate configuration as shown, DMAC 206 and/or the memory interface 210 may function integrally with PU 208 and one or more (preferably all) sub-processing units (SPU) 208. Thus, DMAC 206 is shown in dashed lines.

PU 204 can be, e.g., a standard processor capable of stand-alone processing of data and applications. In operation, PU 204 schedules and orchestrates the processing of data and applications by the sub-processing units. The sub-processing units preferably are single instruction, multiple data (SIMD) processors. Under the control of PU 204, sub-processing units 208 perform the processing of data and applications in a parallel and independent manner. DMAC 206 controls access, by PU 204 and sub-processing units 208, to the data and applications stored in DRAM 214. It is noted that PU 204 may be implemented by one of the sub-processing units 208, taking on the role of a main processing unit that schedules and orchestrates the processing of data and applications by sub-processing units 208.

In accordance with this modular structure, the number of processor elements employed by a particular computer system is based upon the processing power required by that system. For example, a server may employ four processor elements, a workstation may employ two processor elements and a PDA may employ a single processor element. The number of sub-processing units of a processor element assigned to processing a particular software cell depends upon the complexity and magnitude of the programs and data within the cell.

Figure 2:
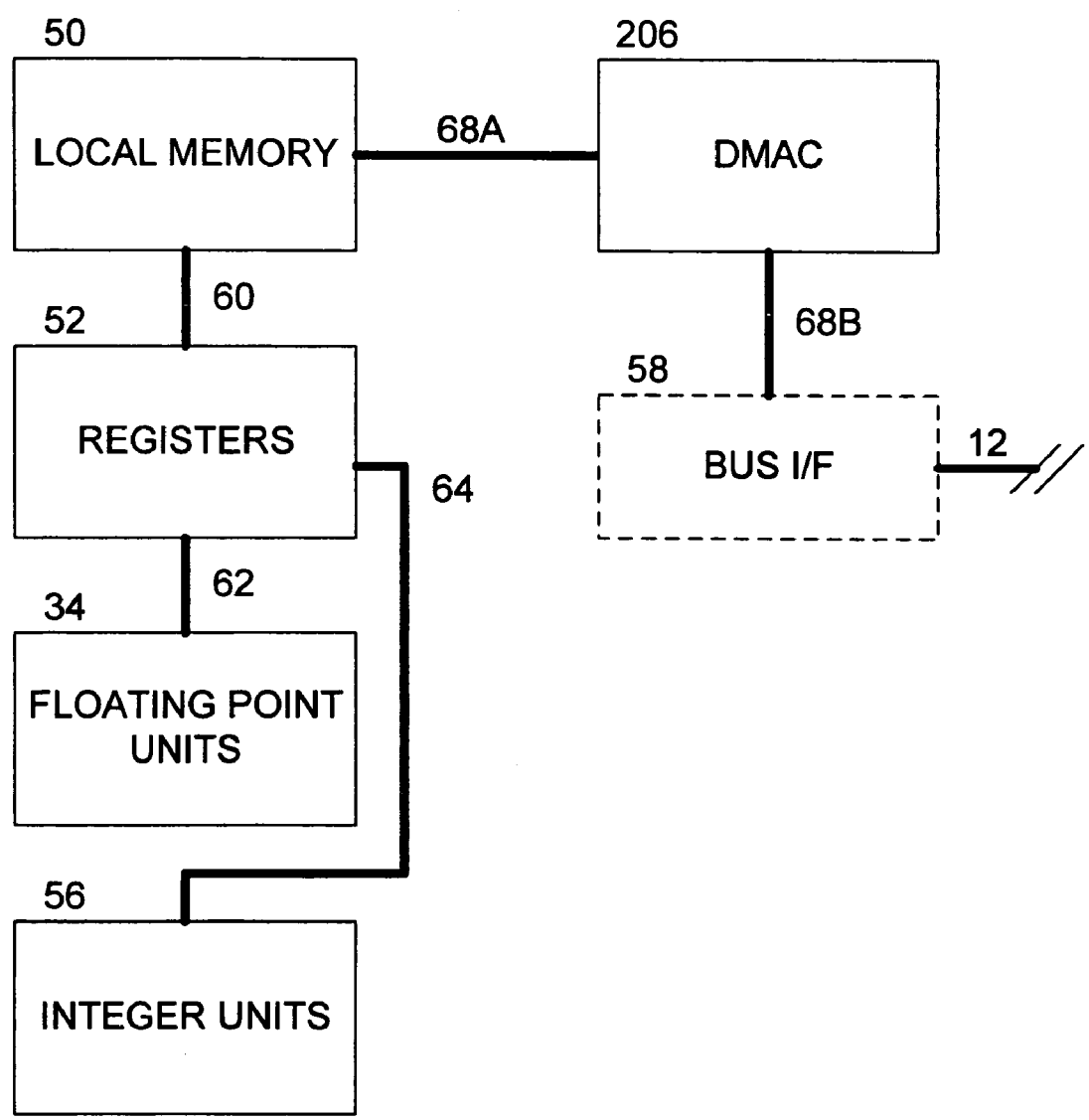
FIG. 2 illustrates the preferred structure and function of a sub-processing unit.

FIG. 2 illustrates the preferred structure and function of a sub-processing unit 208. sub-processing unit 208 includes local memory 50, registers 52, one or more floating point units 34 and one or more integer units 56. Again, however, depending upon the processing power required, a greater or lesser number of floating points units 34 and integer units 56 may be employed. In a preferred embodiment, the local memory 50 contains 256 kilobytes of storage, and the capacity of registers 52 is 128×128 bits. The floating point units 34 preferably operate at a speed of 32 billion floating point operations per second (32 GFLOPS), and the integer units 56 preferably operate at a speed of 32 billion operations per second (32 GOPS)

The local memory 50 may or may not be a cache memory. The local memory 50 is preferably constructed as a static random access memory (SRAM). A PU 204 (of FIG. 1) may require cache coherency support for direct memory accesses initiated by the PU 204. Cache coherency support is not required, however, for direct memory accesses initiated by the sub-processing units 208 or for accesses from and to external devices.

The sub-processing unit 208 further includes a bus interface (I/F) 58 for transmitting applications and data to and from the sub-processing unit 208. In a preferred embodiment, the bus I/F 58 is coupled to a DMAC 206, which is shown in dashed line to indicate that it may be integrally disposed within the sub-processing unit 208 as shown or may be externally disposed (as shown in FIG. 2). A pair of busses 68, 268B interconnect the DMAC 206 between the bus I/F 58 and the local memory 50. The busses 68A, 68B are preferably 56 bits wide.

The sub-processing unit 208 also includes internal busses 60, 62 and 64. In a preferred embodiment, the bus 60 has a width of 56 bits and provides communications between the local memory 50 and the registers 52. The busses 62 and 64 provide communications between, respectively, the registers 52 and the floating point units 34, and the registers 52 and the integer units 56. In a preferred embodiment, the width of the busses 64 and 62 from the registers 52 to the floating point or the integer units is 384 bits, and the width of the busses 64 and 62 from the floating point or the integer units 34, 56 to the registers 52 is 128 bits. The larger width of these busses from the registers 52 to the floating point or the integer units 34, 56 than from these units to the registers 52 accommodates the larger data flow from the registers 52 during processing. A maximum of three words are needed for each calculation. The result of each calculation, however, normally is only one word.

Figure 3:
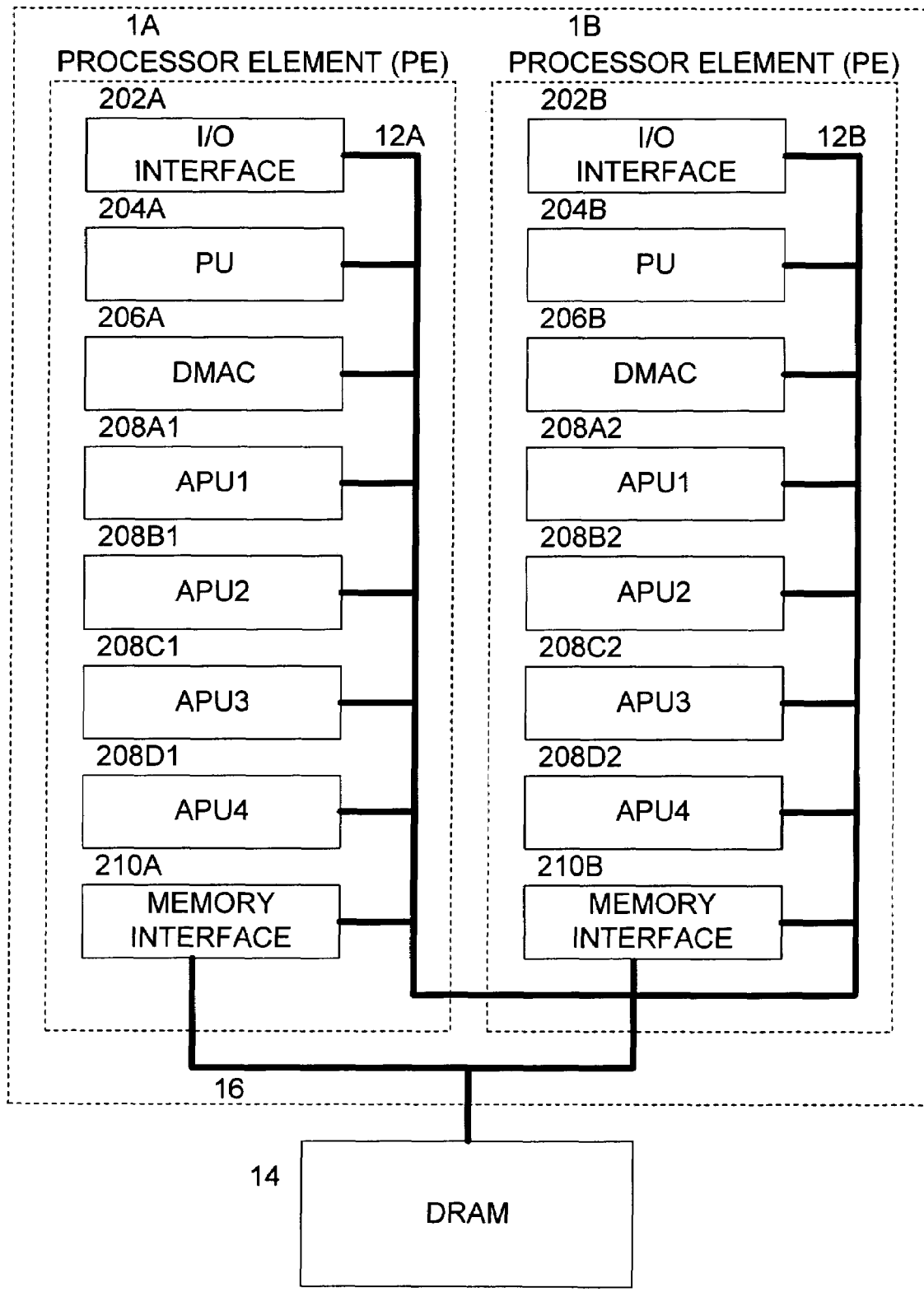
FIG. 3 illustrates two processor elements which may be packaged or joined together, within one or more chip packages, to form a set of multi-processor units.

FIGS. 3 through 6 illustrate multi-processing systems wherein a number of processor elements, as shown in FIG. 1, may be joined or packaged together to provide enhanced processing power. For example, as shown in FIG. 3, two or more processor elements 1A, 1B may be packaged or joined together, e.g., within one or more chip packages, to form a set of multi-processor units. This configuration may be referred to as a broadband engine (BE). As shown in FIG. 3, the broadband engine 80 contains the two processor elements 1A, 1B, which are interconnected for data communication over a buss 12A and 12B. An additional data bus 16 is preferably provided to permit communication between the processor elements 1A, 1B and the shared DRAM 14. One or more input/output (I/O) interfaces 202A and 202B and an external bus (not shown) provide communications between the broadband engine 80 and any external elements. Each of the processor elements 1A and 1B of the broadband engine 80 perform processing of data and applications in a parallel and independent manner analogous to the parallel and independent processing of applications and data performed by the sub-processing elements 208 discussed hereinabove with respect to FIG. 1.

Figure 4:
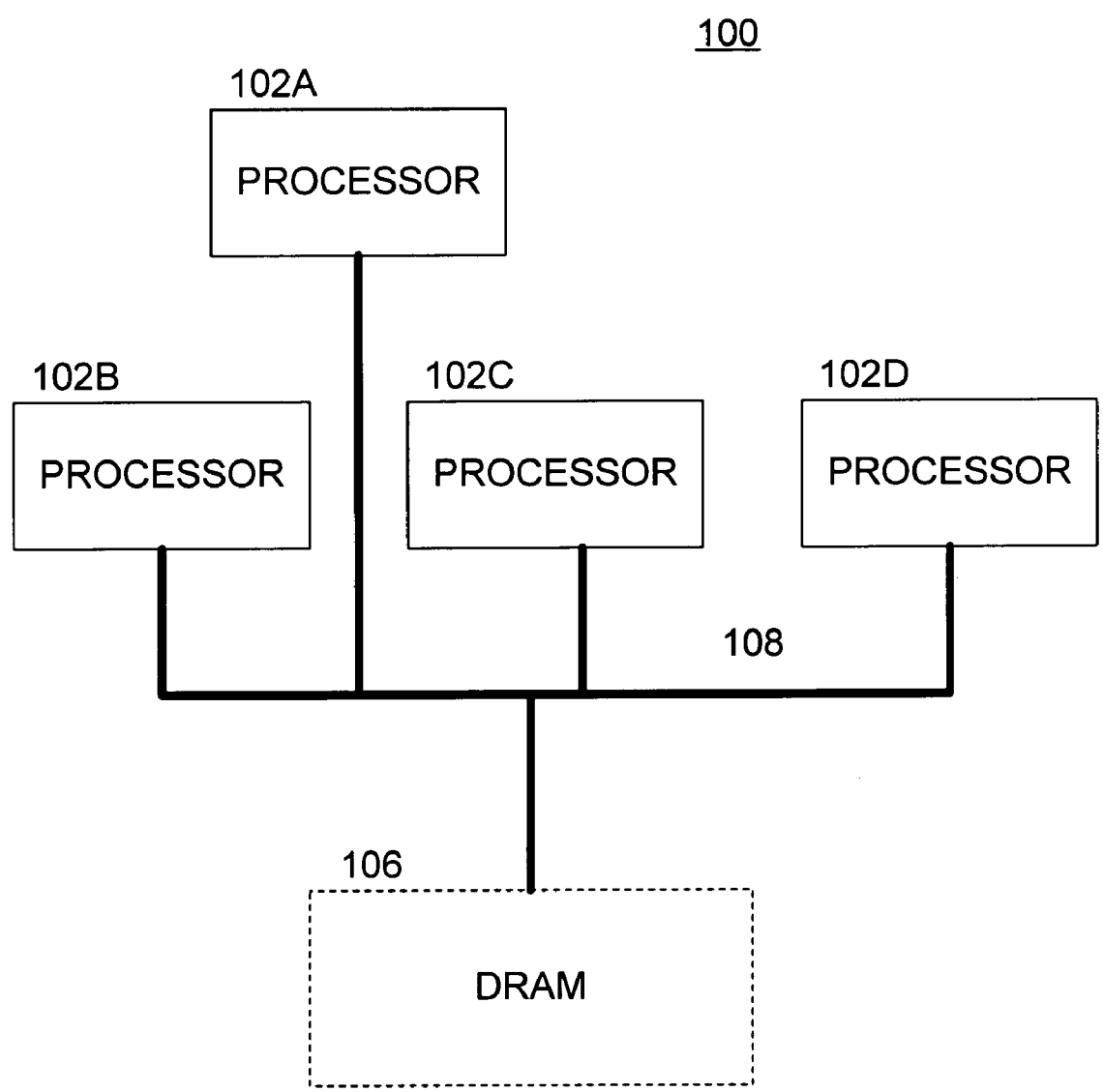
FIG. 4 is a block diagram of a preferred embodiment of a multi multi-processing system.

With reference to FIG. 4, a block diagram of one preferred embodiment of a multi multi-processing system is shown in which multi-processing system 100 includes a plurality of processors 102 (any number may be used) coupled to memory, such as DRAM 106, shared over bus 108. It is noted that DRAM memory 106 is not required (and thus is shown in dashed line). Indeed, one or more processing units 102 may employ its own memory (not shown) and have no need for shared memory 106.

One of the processors 102 is preferably a main processing unit, for example, processing unit 102A. The other processing units 102 are preferably sub-processing units (SPUs), such as processing unit 102B, 102C, 102D, etc. All of the processing units 102 need not have the same internal organization; indeed they may be of heterogeneous or homogenous configurations. In operation, the main processing unit 102A preferably schedules and orchestrates the processing of data and applications by the sub-processing units 102B-D such that the sub-processing units 102B-D perform the processing of these data and applications in a parallel and independent manner.

It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

The participating sub-processing units may include one or more further sub-processing units of one or more further multi-processing systems, such as system 100 (FIG. 4), system 200 (FIG. 1), and/or system 80 (FIG. 3). As will be apparent to one skilled in the art from the description hereinabove, the participating sub-processing units, therefore, may include one or more respective groups of sub-processing units, where each group is associated with a respective main processing unit. As to the system 100 of FIG. 4, the main processing unit is processor 102A and the respective group of sub-processing units include processors 102B-D, which are associated with the main processing unit 102A. Similarly, if system 200 of FIG. 1 is employed, then the participating sub-processing units may include further sub-processing units 208A-D that are associated with a further main processing unit 204. Still further, if the system 80 (broadband engine) of FIG. 3 is employed, then the participating sub-processing units may include an additional two (or more) groups of sub-processing units 208A1-D1, which are associated with the main processing unit 204A, and sub-processing units 208A2-D2, which are associated with main processing unit 204B.

In this regard, the participating groups of sub-processing units (and the respective associated main processing units) may be part of a set of multi-processing units, such as is illustrated in FIG. 3 in which the respective groups of sub-processing units share a common data bus 12A or 12B. Alternatively, or in addition, one or more of the respective groups of participating sub-processing units may be a stand alone multi-processing unit, such as is illustrated in FIG. 1 or 2, where no such common data bus exists between respective groups of sub-processing units. Further, one or more of the respective groups of participating sub-processing units may be at least part of a distributed multi-processing unit, where at least some of the sub-processing units are remotely located with respect to one another.

Figure 5:
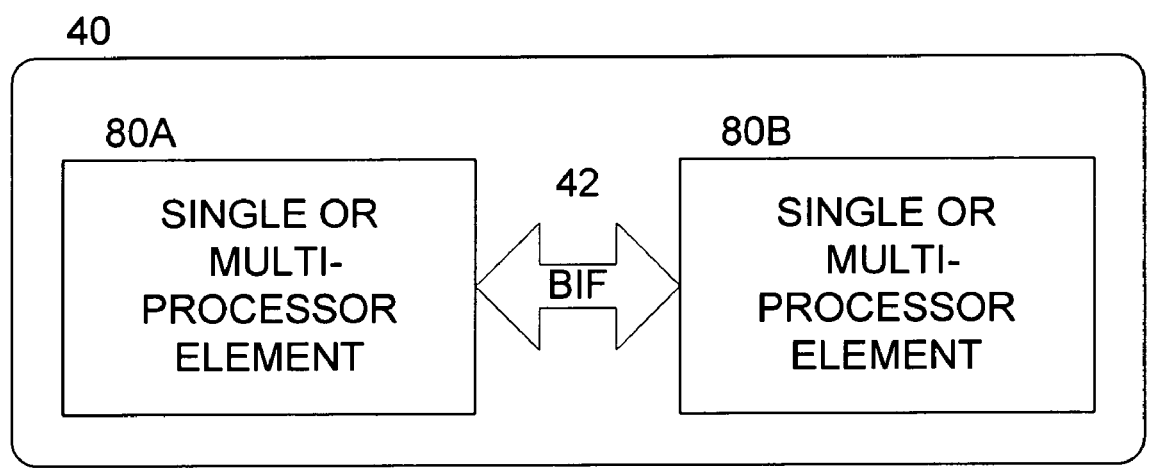
FIG. 5 illustrates multi-processing units as part of a set and as part of a stand alone configuration.

With reference to FIG. 5, the respective multi-processing units, whether part of a set or part of a stand alone configuration, may be disposed on common or different circuit boards, in common or different products, and/or at common or different locations. As shown in FIG. 5, a pair of broadband engines 80A and 80B (which happen to include respective sets of multi-processor elements 200 (shown in FIG. 1)) are disposed on common circuit board 40. Although broadband engines 80A and 80B are illustrated in this example, it is noted that stand-alone multi-processing units (such as employing a single processor element 200 of FIG. 1) are also contemplated. Respective multi-processing units 80A and 80B are interconnected by way of a broadband interface (BIF) 42.

Figure 6:
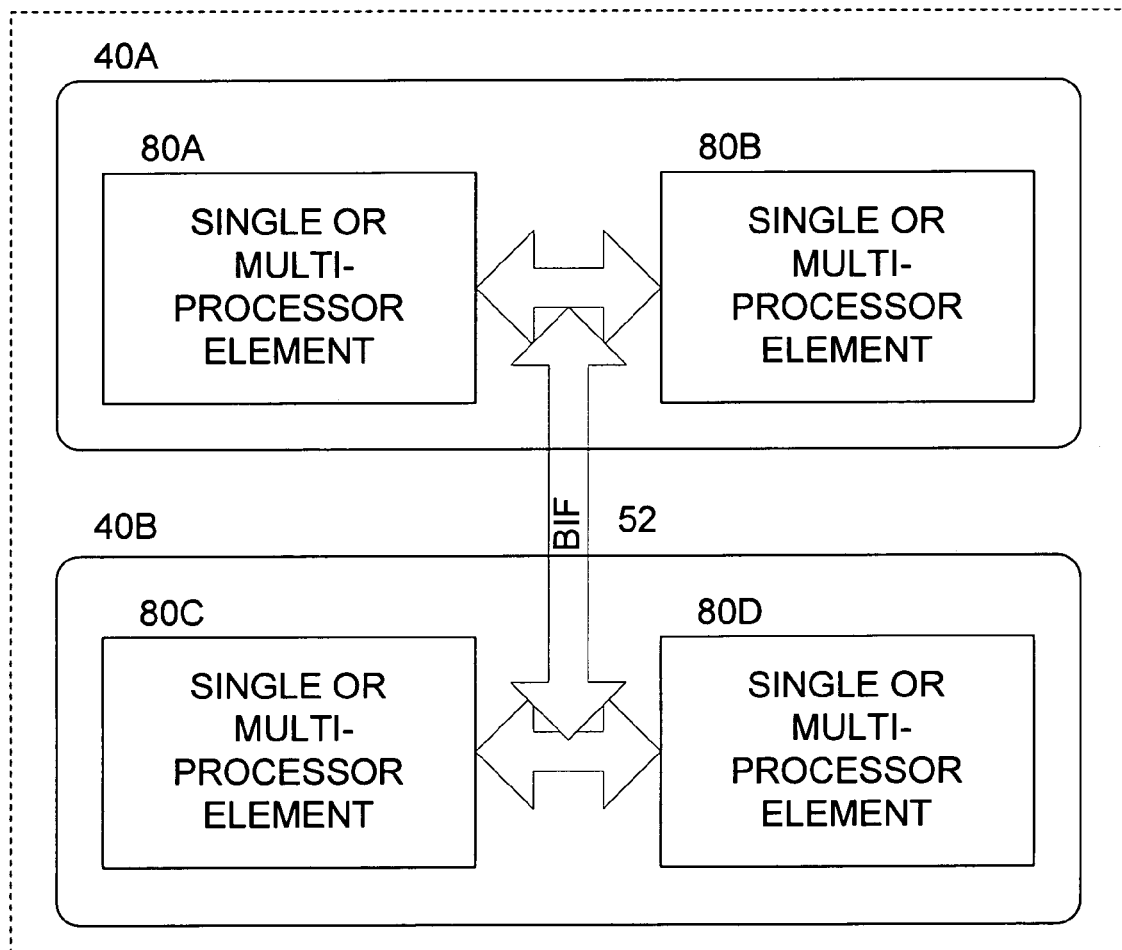
FIG. 6 illustrates a plurality of multi-processing units which may be disposed on different circuit boards and disposed in a single product.

With reference to FIG. 6, a plurality of multi-processing units 80A-D may be disposed on different circuit boards 40, while circuit boards 40 are disposed in a single product 44. More particularly, multi-processing units 80A and 80B are disposed on a common circuit board 40A, while the multi-processing units 80C and 80D are disposed on a different circuit board 40B. Both circuit boards 40A and 40B, however, are disposed within a single product 44. Thus, data communications between the respective multi-processing units 80A-D may be carried out by way of a broadband interface (BIF) 52 that may include an intra-circuit board portion and an inter-circuit board portion.

Figure 7:
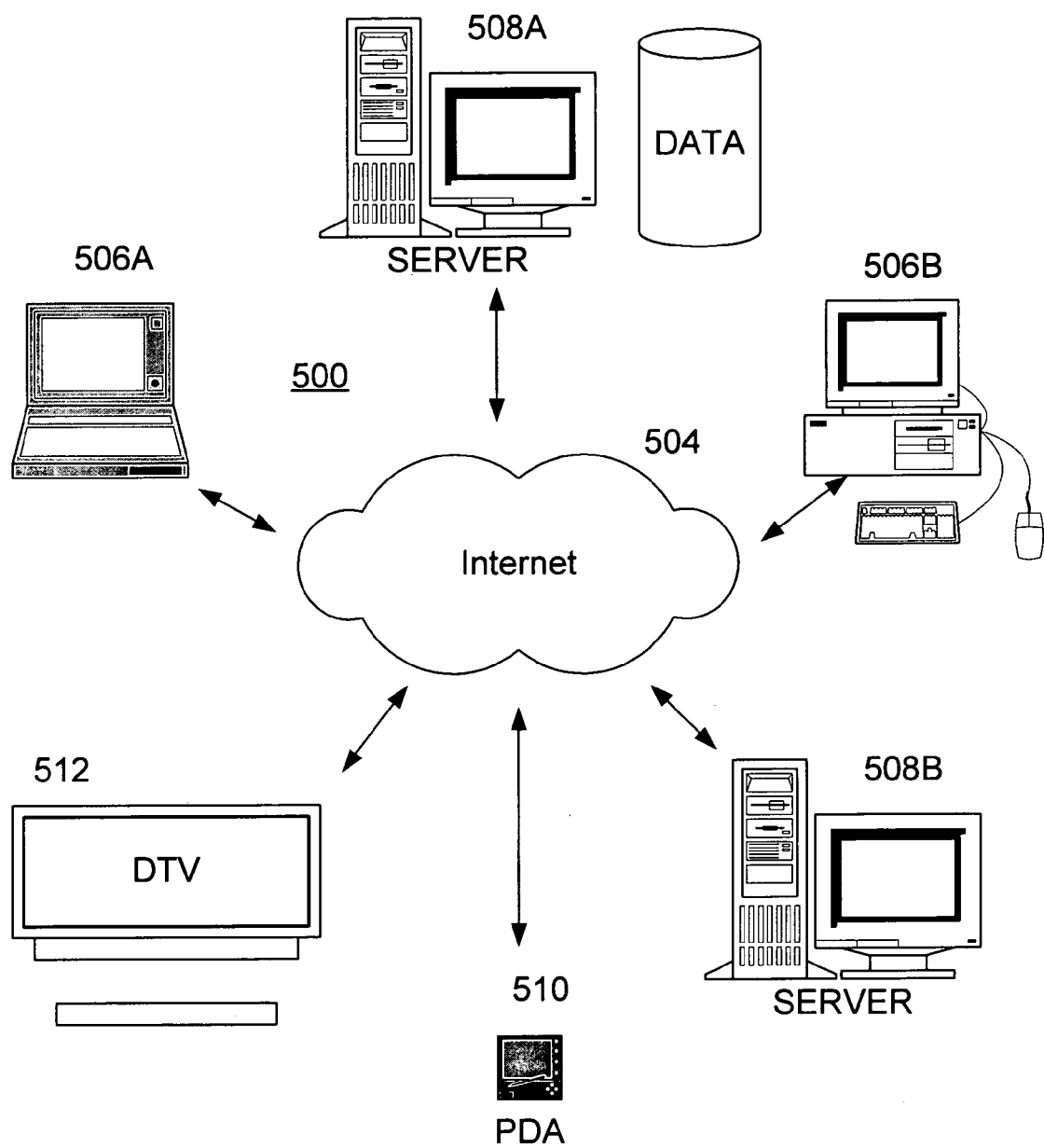
FIG. 7 illustrates stand-alone multi-processing elements or broadband engines (sets of multi-processing elements) which may be distributed among a plurality of products to form a multi-processing system.

As discussed above, the participating sub-processing units (e.g., 102B-D and/or 208A-D) of the respective multi-processing units may be disposed in different products. Data communications among such products (and sub-processing units) must, therefore, employ more than a bus interface and/or broadband interface within a single product. In this regard, reference is now made to FIG. 7. Here, stand-alone multi-processing elements 200 or BEs 80 (sets of multi-processing elements) may be distributed among a plurality of products to form multi-processing system 500. The elements or members (implemented as computer and/or computing devices) of system 500 are preferably in communication over network 504. Network 504 may be a local area network (LAN), a global network, such as the Internet, or any other computer network.

The members that are connected to network 504 include, e.g., client computers 506, server computers 508, personal digital assistants (PDAs) 510, digital television (DTV) receivers 512, and other wired or wireless computers and computing devices. For example, client 506A may be a laptop computer constructed from one or more of PEs 200 or other suitable multi-processing systems. Client 506B may be a desk-top computer (or set top box) constructed from one or more of PEs 200 or other suitable multi-processing systems. Further, server 508A may be a administrative entity (employing a database capability), which is also preferably constructed from one or more PEs 200.

Figure 8:
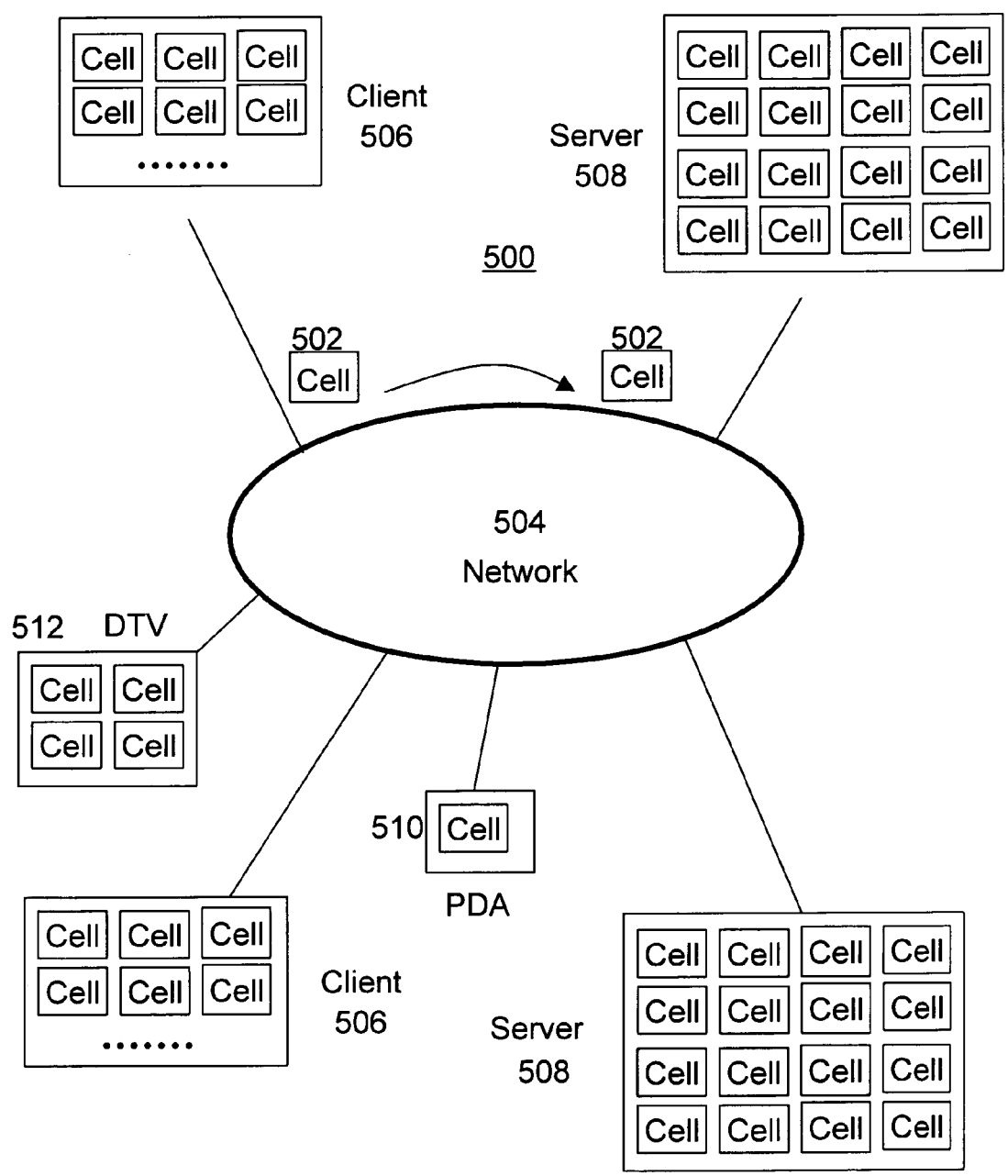
FIG. 8 is a block diagram of an overall computer network in accordance with one or more aspects of the present

The processing capabilities of multi-processing system 500 may rely on a plurality of processor elements 200 disposed locally (e.g., one product) or disposed remotely (e.g., in multiple products). In this regard, reference is made to FIG. 8, which is a block diagram of an overall computer network in accordance with one or more aspects of the present invention. Again, the PEs 200 and/or broadband engines 80 (made of multiple PEs) may be used to implement an overall distributed architecture for computer system 500.

Since servers 508 of system 500 perform more processing of data and applications than clients 506, servers 508 contain more computing modules (e.g., PEs 200) than clients 506. PDAs 510, on the other hand, in this example perform the least amount of processing. Thus, PDAs 510 contain the smallest number of PEs 200, such as single PE 200. DTVs 512 perform a level of processing that is substantially between that of clients 506 and the servers 508. Thus, DTVs 512 contain a number of processor elements between that of clients 506 and servers 508.

Figure 9:
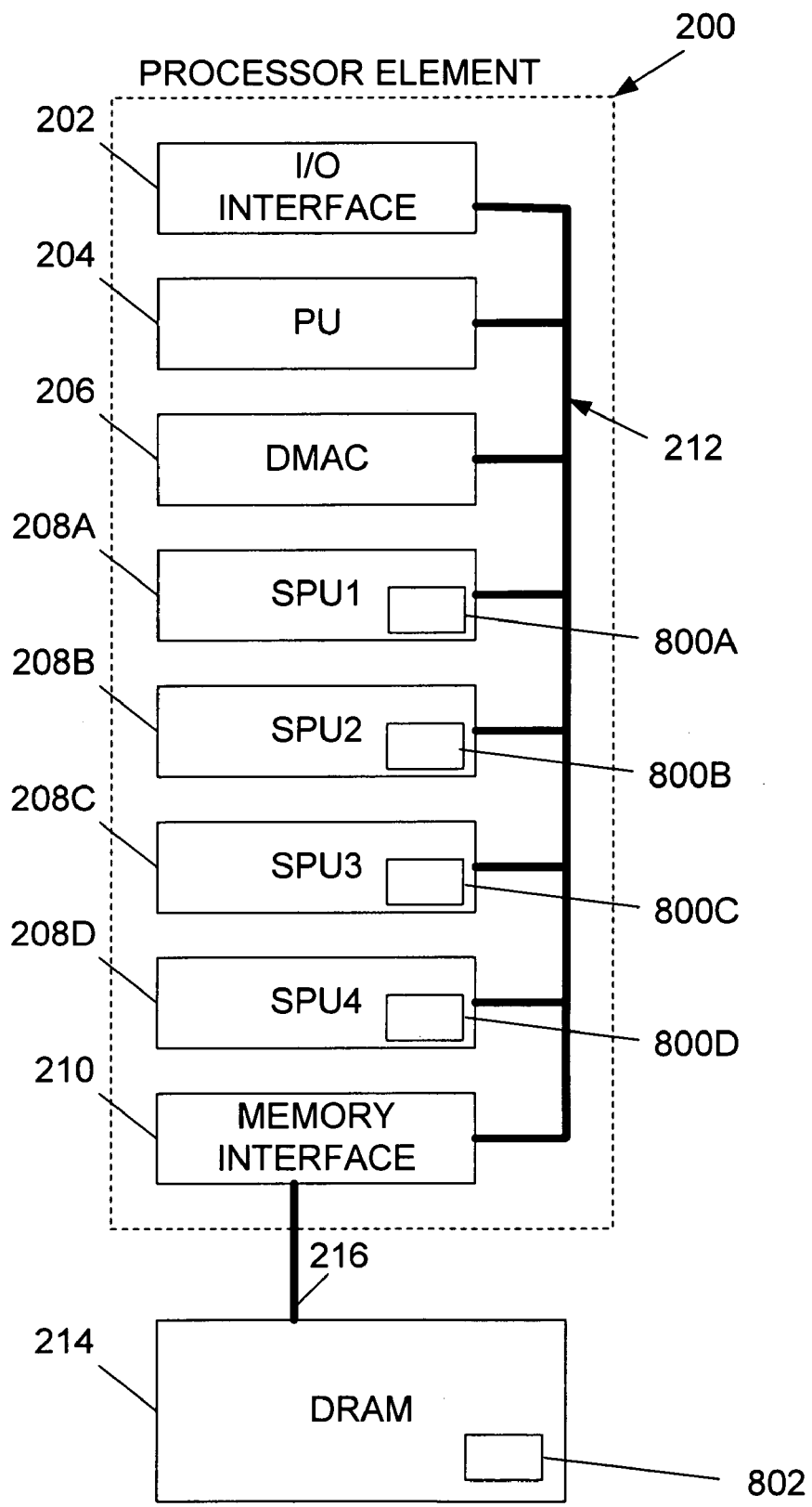
FIG. 9 illustrates a multiprocessor system in which the sub-processors each include a buffer sync controller in accordance with a preferred embodiment of the present invention.

FIG. 9 illustrates one preferred embodiment of a multiprocessor system, according to one aspect of the invention, which includes main processor unit 204, a plurality of sub-processor units (SPUs) 208A through 208D, denoted generally and referred herein collectively as SPUs 208, and direct memory access controller DMAC 206. DRAM 214 is also provided and shared as a common memory among the main and sub-processor units. DMAC 206, according to one aspect of the invention, is preferably an on-chip device that controls data transfers between two locations without having to use the computing system's main processor (in this instance, main processor unit 204) to effect the transfer. DRAM 214 is preferably composed of a number of dynamic random access memories. However, DRAM 214 may comprise various different types of memory such as static random access memory (SRAM), magnetic random access memory (MRAM), optical memory, holographic memory, and the like.

As described in more detail below, each SPU 208 preferably includes a buffer sync controller 800A-800D for controlling access to shared data in shared memory 214. When one of the sub-processor units 208 requests information from DRAM 214 as a result of normal software program control or by virtue of a program interrupt, the accessed memory location(s) within the shared memory must contain current data. Consequently, the read and write operations of the subprocessors must be synchronized to ensure that correct data is accessed in memory that is shared among the subprocessors. The present invention can accomplish proper processor synchronization, for example in connection with a READ of or a WRITE to shared memory 214, as described below.

In one aspect of the invention, each SPU 208A-208D, includes a corresponding buffer sync controller 800A-800D to control read and write access to data shared among processors. Namely, each buffer sync controller operates to check whether the shared data in memory is being read or written to, and can set and store shared parameter data to track such reads and writes to provide synchronization among the SPUs. The shared parameter data can be stored in shared memory such as DRAM 214, in a memory location such as shared parameter data memory buffer 802.

Figure 10:
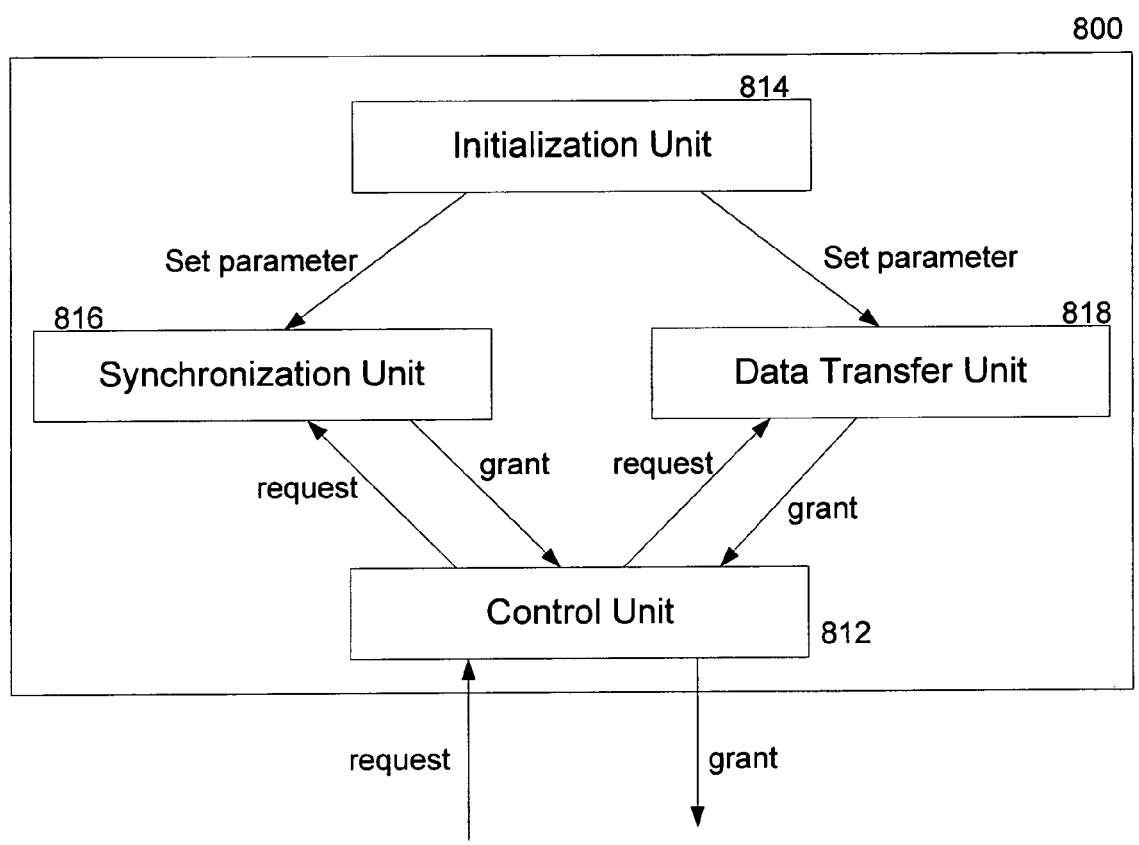
FIG. 10 illustrates one preferred arrangement of a buffer sync controller used in accordance with the present invention.

FIG. 10 depicts a preferred embodiment of a buffer sync controller 800, which can be implemented via software or hardware within each SPU.

Namely, the buffer sync controller 800 includes a control unit 812, an initialization unit 814, a synchronization unit 816 and data transfer unit 818. Initialization unit 814 is operative to create sync buffer entries (e.g., sync buffer 802) in the shared parameter data memory buffer 802. This is where the shared parameter data or pointers to such data is to be stored for use in synchronization of the SPUs. If an SPU processing the shared data is the first SPU involved, then the initialization unit 814 of that SPU will create the shared parameters and place those parameters (or pointers to such parameters) in the shared parameter data memory buffer 802. It will then return a pointer to the shared parameter data. If the SPU processing the shared data is not the first processor, that SPU's initialization unit will get the pointer to the shared parameter and return the pointer to the shared parameter to the buffer sync controller.

In terms of the shared parameter data, two variables are preferably provided, namely, WL (writer lock) and RC (reader count). WL and RC are preferably stored in shared parameter data memory buffer 802, or index pointer pointing to such variables may alternatively be stored in parameter data buffer memory 802. The WL variable sets a flag, e.g., WL=1, in connection with a SPU writing data to the shared memory, a procedure generally referred to as a WRITE. When the WL flag is set to a predetermined status (such as WL=1), no other SPU may access the shared data.

The variable RC tracks the number of SPUs reading the shared data in the shared memory, generally referred to as a READ. In accordance with the present invention, in order for a WRITE to shared memory to proceed, it is preferable that no other processor is attempting to read the shared data. Thus, for example, this condition of "no read" attempts can be set via the setting of RC to a predetermined value, such as zero. Once new data is written, and no further writing is done which can be indicated by WL being set to zero, a multiple number of SPUs may then READ the data in shared memory with each READ, RC can be set to a value corresponding to the number of SPUs accessing the shared data. Accordingly, with the present invention, where an SPU 208 tries to read or write shared data and the data is being accessed and updated by another SPU, the SPU cannot start reading or otherwise processing the data until the data is released for sharing in memory. This is especially important in application such as image processing applications, where each processor in a multiprocessor system is assigned to process a part of an image frame which should be processed within the display time of the frame. As a consequence thereof, synchronization of processor operation is needed.

During a writing operation, the control unit 812 is operative to receive the pointer to the shared parameter and the pointer to the shared data which should be written to. The control unit then determines if it is ready to write the data. Next, the synchronization unit 816 checks the shared parameter data to determine if a write can be accomplished, such as by checking the value of variables WL and RC. If a grant signal comes from the synchronization unit 816, the control unit 812 calls the data-transfer unit 818 to transfer the data. Finally, the data transfer unit 818 transfers the shared data to the shared memory area for access by a subsequent SPU.

The shared parameter data can also include, but is not limited to, other memory information (e.g., start address, size, etc.), type of synchronization (type and parameter according to a set of parameters), state of synchronization, and type of data buffer (e.g., kind of buffer, data granularity, size, etc.). Additionally, the shared parameter data includes variables WL and RC previously discussed. The shared parameter data is shared among the SPUs and the information contained therein ensures that shared data being accessed by each SPU is current.

Figure 11:
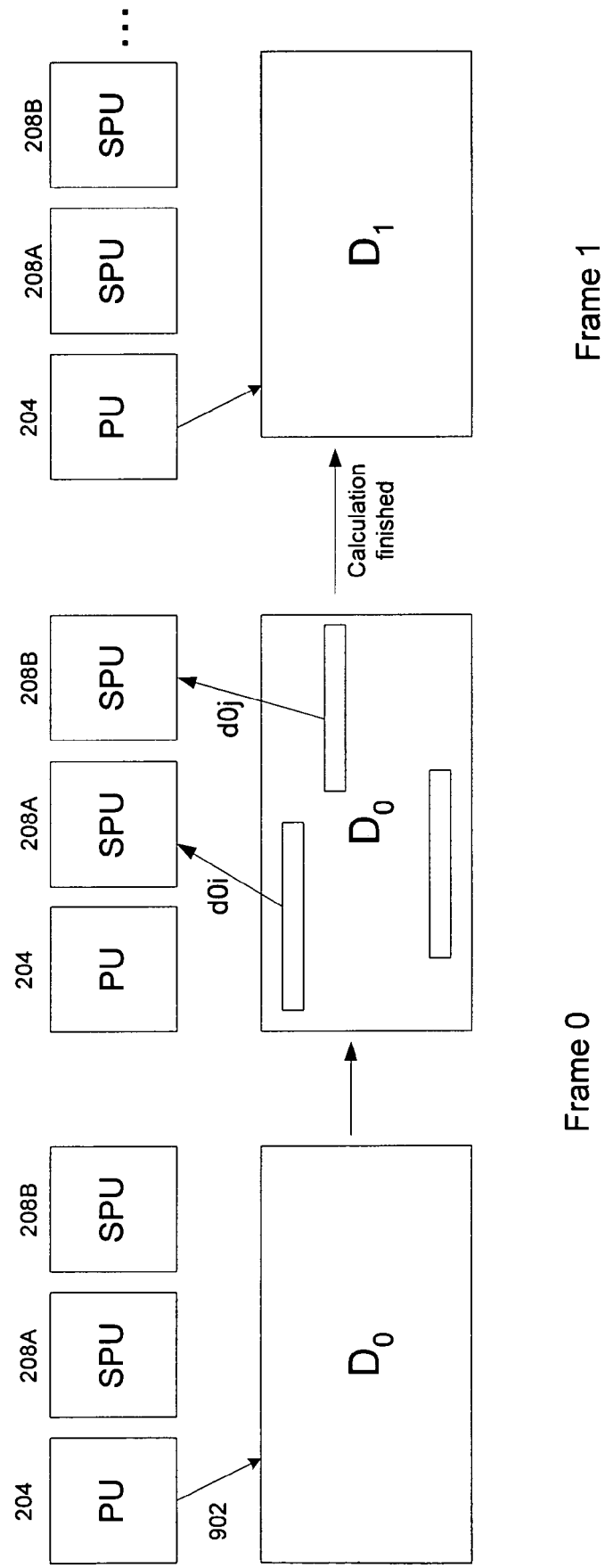
FIG. 11 illustrates the processing of shared data by processors in a multiprocessor system.

FIG. 11 illustrates processor and shared data interaction in connection with processing a data stream of information (such as packets), for example with an image processing application processing image frames. Processor 204 or an SPU can initialize the shared parameter data buffer memory (sync buffer) which stores the shared parameter data or pointers to such data in system memory. Thus, the PU here writes (as indicated by arrow 902) shared data $D_0$ for FRAME 0 as shown in shared memory. Pseudo code for creating a synchronization object buffer syncB, a memory location in shared memory 214 for holding the shared data, $D_m$, is illustrated below.
Initialize synchronization
create buffer (syncB)
Main loop:
Create data Dm
Write Dm to syncB $m=m30\ 1$ In connection with processing of data $D_0$, SPUs 208 need to READ and WRITE (process) such data. In FIG. 11, once the data is placed in the shared memory, shared data $d0_i$ and $d0_j$ is read and processed by the subprocessors. Once the processing of the data for Frame 0 is complete, PU 204 can then obtain the next frame, Frame 1, which can be processed in the same manner as Frame 0. Pseudo code implementing a READ of shared data by a subprocessor unit (SPU) is illustrated below:
Initialize synchronization:
Get data from sync buffer (syncB)
Main loop:
Sub loop:
get place of data . . . i
get data from and calculate loop while (I<num)

In summary, as shown in FIG. 11, the PU 204 prepares $D_0$ and the SPUs 208A, 208B will use $D_0$. When an SPU tries to read the part of $D_0$ and $D_0$ is not written by the PU, the SPU has to wait. When the PU finishes the write to $D_0$, the SPU starts to read. The sync buffer utilizes such data synchronization. The sync buffer may also care about the location of the buffer. For example, a sync buffer A may have fragment areas A1, A2, A3, . . . , AN. A processor (e.g., a consumer) may want to read A3 and the other processor (e.g., a producer) creates A3 and the consumer will be released immediately.

Figure 12:
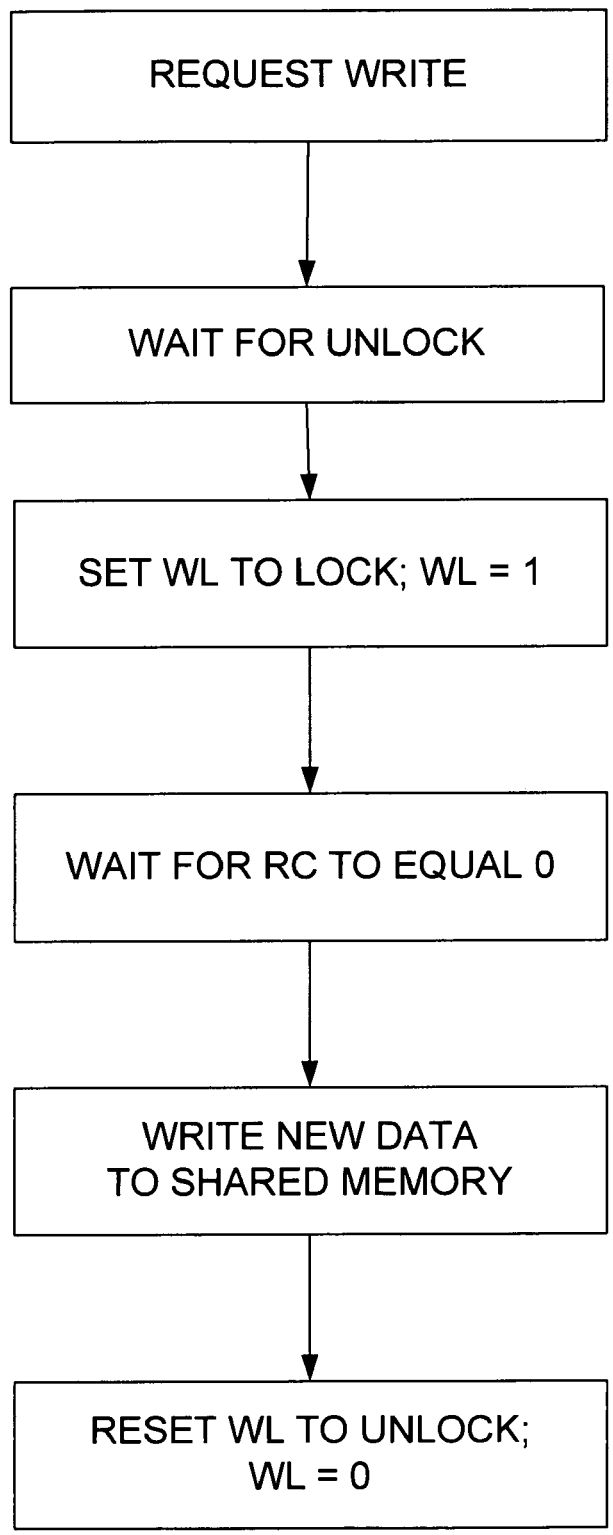
FIG. 12 illustrates a flow chart of a WRITE to shared memory according to one aspect of the invention.

Writing information to shared memory occurs in connection with a WRITE command by an SPU. A WRITE in conjunction with buffer sync controller 800 occurs in connection with an SPU accessing data from shared memory and then changing the data therein. When a write request by a SPU occurs, a wait for an unlock is encountered, e.g., WL=0; WL is then set to lock (e.g., WL=1); a wait for a status indicating that no other processor is reading data is encountered (e.g., RC=0); a WRITE to the shared memory occurs; and an unlock condition is then set (e.g., WL is reset to zero). This procedure is outlined in the flowchart of FIG. 12.

Figure 13:
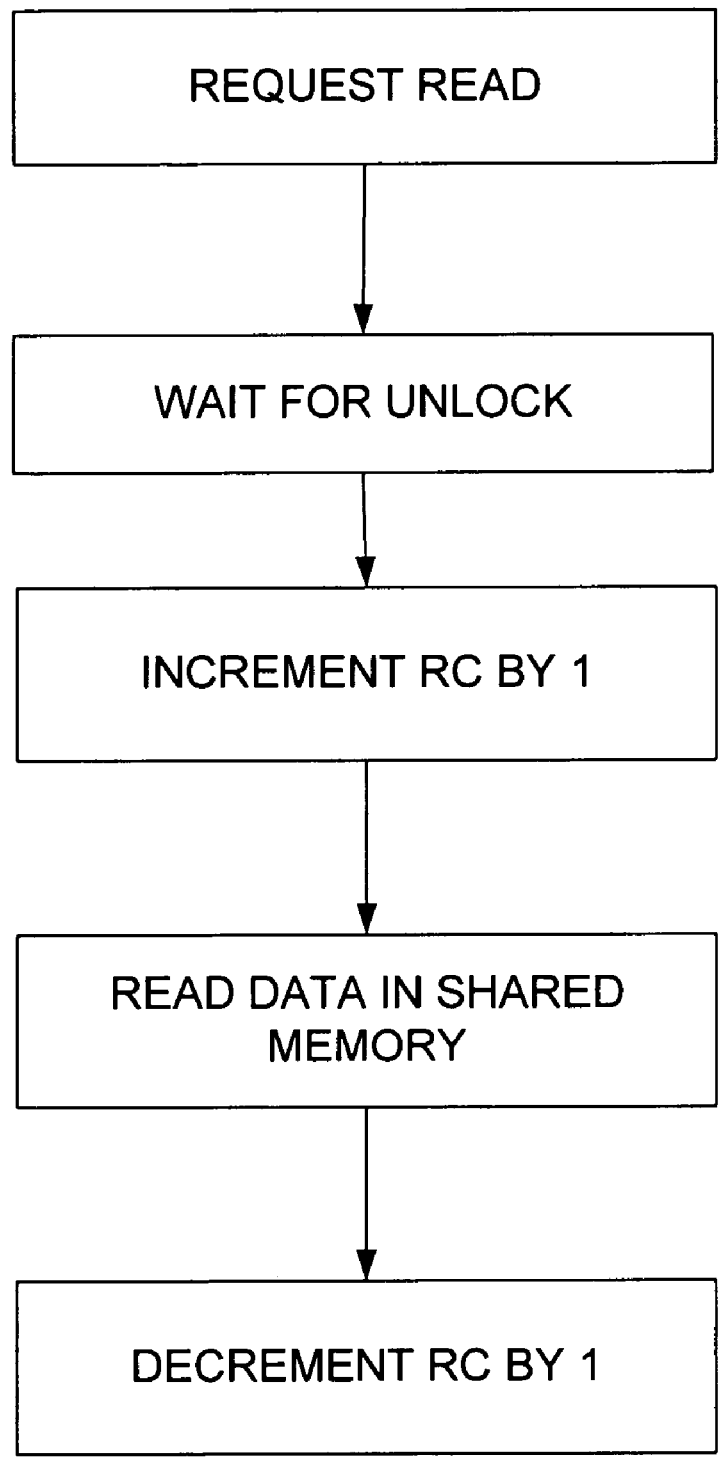
FIG. 13 illustrates a flow chart of a READ of shared memory according to one aspect of the invention.

A READ occurs in connection with a processor (204,208) accessing data from shared memory without causing the data to change therein. The memory location is merely read. In connection with control unit 812 or buffer sync controller 800, control unit 812 initiates a READ request to synchronization unit 816 after receiving a request to read shared data from an SPU. Synchronization unit 816 determines whether a READ is allowed based on the shared parameter data. If the shared parameter data is in the proper state, a GRANT signal is issued from the synchronization unit 816 to the control unit 812. In response thereto, the control unit 812 issues a request to the data transfer unit 818 to permit the transfer of data to be read by the SPU. In response to the Grant signal issued from the data transfer unit 818, control unit 812 issues a signal granting access to the shared memory and permission to read shared data by the SPU, which is requesting permission to read shared data. As this pertains to a READ request, a wait for the unlock condition (e.g., WL=0) is encountered, the Reader Count variable is the incremented (e.g., RC=RC1); a READ of data from the shared memory occurs; and the Reader Count RC is decremented after the READ is accomplished. This procedure is outlined in the flowchart of FIG. 13.

The present invention is especially useful imaging applications, such as with a codec code used in JPEG and MPEG coding and decoding. It is also useful for any application that uses multiple processors (e.g., PU and SPUs) that communication with one another.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of providing synchronization of shared data access among a plurality of processors in a multi-processor system comprising:
   creating a synchronization object buffer in a shared memory external to the plurality of processors;
   storing data shared by the plurality of processors in the synchronization object buffer in the shared external memory;
   storing, in the shared memory, shared parameter data including one or more conditions relating to access to the data shared by a plurality of processors, the shared parameter data also including start address information and size information of the data shared by the plurality of processors;
   modifying in the shared memory the shared parameter data based on the access by the processors to the shared data; and
   preventing and granting access to the shared data by the processors based on the shared parameter data maintained in the shared memory.

2. A method according to claim 1, wherein the one or more conditions includes a first condition indicating the number of the processors accessing the shared data and a second condition indicating whether the access to the shared data is being denied in writing to the shared data.

3. A method as according to claim 2, wherein the access to read the shared data is granted upon the second condition indicating that none of the processors are writing to the shared data.

4. A method according to claim 3, wherein access to write to the shared data by one of the processors is granted upon the second condition being set to deny access to the shared data by all other of the processors following an indication by the second condition that none of the processors were writing to the shared data.

5. A system for providing synchronization of shared data access among a plurality of processors comprising:
   a plurality of processors, and
   a shared memory external to the processors,
   a first one of the plurality of processors operable to creating a synchronization object buffer in the shared external memory, the synchronization object buffer storing shared data that is shared by the plurality of processors,
   each of the processors including a buffer sync controller for processing shared parameter data maintained in the shared memory and to control access to the shared data shared by the plurality of processors in accordance with the state of the shared parameter data maintained in the shared memory, wherein the shared parameter data includes start address information and size information of the shared data.

6. A system according to claim 5, wherein the shared parameter data indicates the number of processors reading the shared data.

7. A system according to claim 5, wherein the shared parameter data indicates whether one of the processors is writing to the shared data.

8. A system according to claim 5, wherein the plurality of processors includes at least at least two or more sub-processors.

9. A system according to claim 8, further comprising a direct memory access controller for controlling access to the shared data by the plurality of processors.

10. A system according to claim 5, wherein the shared parameter data includes a first condition indicating the number of the processors accessing the shared data and a second condition indicating whether the access to the shared data is being denied in writing to the shared data.

11. A system according to claim 5, wherein the shared parameter data includes a writer lock parameter associated with writing to the shared data and a reader count parameter associated with the number of processors reading the shared data.

12. A system according to claim 5, wherein the shared parameter data is stored in a shared parameter data buffer in the shared external memory.

13. A system as recited in claim 5, wherein the buffer sync controller is integrated with the processors.

14. A method of providing synchronization of shared data access among in a multi-processor system comprising:
  creating a synchronization object buffer in a shared memory external to a plurality of processors in the multi-processor system;
  sharing data among the plurality of processors in accordance with one or more conditions provided by shared parameter data maintained and modifiable in the shared memory;
  storing the shared data in the synchronization object buffer in the shared memory; and
  preventing and granting access to the shared data by one or more of the processors based on the one or more conditions;
  wherein the shared parameter data includes start address information and size information of the shared data.

15. A buffer sync controller for providing synchronization of shared memory access in a multi-processor system by a plurality of processors, comprising:
  an initialization unit for creating a synchronization object buffer in a shared memory external to the plurality of processors and for providing shared parameter data including a first parameter and a second parameter maintained in the shared external memory, the first parameter being indicative of a number of processors reading shared data and the second parameter being indicative of whether the shared data is being written to by one of the processors;
  a control unit;
  a synchronization unit for receiving a request for access to the shared data from the control unit and for granting the request for access based on the states of the first and second parameters maintained in the shared memory; and
  a data transfer unit for receiving a request to transfer data from the shared memory by the control unit and granting the request to transfer data in connection with predetermined values of the first and second parameters;
  wherein the shared data is stored in the synchronization object buffer and the shared parameter data further includes start address information and size information of the shared data.

16. A method for providing synchronization for memory access of data pursuant to a write to shared memory in a multiprocessor system comprising:
  creating a synchronization object buffer in a shared memory external to a plurality of processors in the multiprocessor system;
  storing data shared by the plurality of processors in the synchronization object buffer;
  receiving a request to write to the synchronization object buffer by a selected processor;
  receiving a read count indication from a read count parameter maintained in the shared external memory that no other processors are reading data in the synchronization object buffer;
  receiving a write access condition from a write access condition parameter maintained in the shared external memory indicating the synchronization object buffer is available to read;
  setting the write access condition to prevent other processors from access to the synchronization object buffer;
  writing data to the synchronization object buffer after setting the access condition to prevent access by other processors;
  storing, in the shared external memory, shared parameter data including start address information and size information associated with the synchronization object buffer; and
  setting the write access condition to enable other processors to access the synchronization object buffer after writing the data.

17. A method according to claim 16, further comprising storing the write access condition and the read count condition in the same region of memory as the synchronization object buffer accessible by the processors.

18. A method for providing synchronization for memory access pursuant to a read of shared memory area in a multiprocessor system comprising:
  requesting a read of data in a synchronization object buffer of a shared memory external to the processors of the multiprocessor system;
  receiving an access flag from the shared external memory indicating access to the synchronization object buffer;
  incrementing a READ variable maintained in the shared external memory indicative of the number of processors reading the synchronization object buffer;
  reading data in the synchronization object buffer; and
  decrementing the READ variable following the reading of the data;
  wherein the access flag and the READ variable are part of shared parameter data stored in the shared external memory, the shared parameter data further including start address information and size information of the data in the synchronization object buffer.

19. Apparatus for providing synchronization of shared data access among a plurality of processors comprising:
  a processing element including two or more processing units connected via a bus, the two or more processing units being connectable to a memory and operable to issue instructions,
  wherein the processing units are programmed to share data in accordance with one or more conditions provided by shared parameter data stored in a shared memory external to the processing units and accessible to the processing units, and to prevent and grant access to the shared data by the processing units based on the one or more conditions maintained in the shared memory;

wherein the shared data is stored in a synchronization object buffer in the shared external memory, and wherein the shared parameter data further includes start address information and size information of the shared data in the synchronization object buffer.

20. A medium storing instructions to cause one or more processors to provide synchronization of shared data access among a plurality of processors comprising instructions for:

creating a synchronization object buffer in a shared memory external to a plurality of processors;

sharing data among the plurality of processors in accordance with one or more conditions provided by shared parameter data stored in the shared external memory;

storing the shared data in the synchronization object buffer; and preventing and granting access to the shared data by one or more of the processors based on the one or more conditions maintained in the shared memory;

wherein the shared parameter data includes start address information and size information of the shared data.

* * * * *